United States Patent [19]

Wheatley et al.

[11] Patent Number: 4,538,464

[45] Date of Patent: Sep. 3, 1985

[54] METHOD OF MEASURING REACTIVE ACOUSTIC POWER DENSITY IN A FLUID

[75] Inventors: John C. Wheatley; Gregory W. Swift, both of Los Alamos; Albert Migliori, Santa Fe, all of N. Mex.

[73] Assignee: The United States of America as represented by the United States Department of Energy, Washington, D.C.

[21] Appl. No.: 539,013

[22] Filed: Oct. 4, 1983

[51] Int. Cl.$^3$ .................................................. G01N 9/00
[52] U.S. Cl. ...................................... 73/646; 374/117; 374/210; 136/212; 136/225
[58] Field of Search .................... 374/117, 118, 29, 30, 374/32; 73/646; 136/224, 225, 212, 227, 228

[56] References Cited

U.S. PATENT DOCUMENTS

| | | | |
|---|---|---|---|
| 1,638,943 | 8/1927 | Little | 136/225 |
| 3,593,818 | 7/1971 | Pohlmann | 374/117 |
| 3,767,470 | 10/1973 | Hines | 136/225 |
| 4,003,250 | 1/1977 | Poppendiek et al. | 374/30 |
| 4,398,398 | 8/1983 | Wheatley et al. | 62/467 R |
| 4,489,553 | 12/1984 | Wheatley et al. | 60/516 |

OTHER PUBLICATIONS

"Determination of Absolute Sound Levels and Acoustic Absorption Coefficients by Thermocouple Probes—Experiment", *The Journal of the Acoustical Society of America*, vol. 26, No. 3, May 1954, William J. Fry and Ruth Baumann Fry, pp. 311–317.

"A Constant-Flow Calorimeter for the Measurement of Acoustic Power of Megahertz Frequencies", *Phys. Med. Biol.*, vol. 22, No. 3, pp. 444–450, May 1977, G. R. Torr and D. J. Watmough.

*Primary Examiner*—Charles Frankfort
*Assistant Examiner*—W. Morris Worth
*Attorney, Agent, or Firm*—William A. Eklund; Paul D. Gaetjens; Judson R. Hightower

[57] ABSTRACT

A method for determining reactive acoustic power density level and its direction in a fluid using a single sensor is disclosed. In the preferred embodiment, an apparatus for conducting the method, which is termed a thermoacoustic couple, consists of a stack of thin, spaced apart polymeric plates, selected ones of which include multiple bimetallic thermocouple junctions positioned along opposite end edges thereof. The thermocouple junctions are connected in series in the nature of a thermopile, and are arranged so as to be responsive to small temperature differences between the opposite edges of the plates. The magnitude of the temperature difference, as represented by the magnitude of the electrical potential difference generated by the thermopile, is found to be directly related to the level of acoustic power density in the gas.

1 Claim, 5 Drawing Figures

METHOD OF MEASURING REACTIVE ACOUSTIC POWER DENSITY IN A FLUID

This invention is the result of a contract with the Department of Energy (Contract No. W-7405-ENG-36).

BACKGROUND OF THE INVENTION

The invention described herein is generally related to acoustic and thermal transducers.

Analyses directed to the measurement of acoustic characteristics in various environments have previously relied primarily on the use of conventional acoustic transducers to measure the power density level and directional characteristics of sound. Such analyses typically involve the measurement of such acoustic characteristics as dynamic pressure and dynamic pressure gradient at different points in space, to determine the optimum design for a given structure for purposes of noise suppression, sound transmission, or for other purposes.

The outputs of conventional acoustic transducers can be combined and processed to determine what is known as the real acoustic power density level, or the acoustic intensity, in a gas or other fluid. There is however another variable, known as the reactive acoustic power density, which is different from real acoustic power density and which may provide additional useful information relating to the acoustic characteristics of various environments. The difference between real and reactive acoustic power density is discussed below. It is sufficient to note here that there has not been previously available any single sensor or transducer for directly measuring either the real or the reactive acoustic power density in a fluid.

The present invention is based on a phenomenon which has been studied by the applicants and which underlies the operation of a class of devices previously disclosed by the applicants in their U.S. Pat. Nos. 4,398,398 and 4,489,553 which are hereby incorporated by reference in the papers "Experiments With an Intrinsically Irreversible Acoustic Heat Engine," J. Wheatley et al., Phys, Rev. Lett. 50, 499 (1983) and "An Intrinsically Irreversible Thermoacoustic Heat Engine," J. Wheatley et al., J. Acoustical Soc. Am. 74, 153 (1983). The phenomenon is a heat transfer process which is intrinsically irreversible in the thermodynamic sense. In practical application, the phenomenon is a heat transfer process by which acoustic energy in a fluid medium produces a temperature gradient and a resultant heat flow in a second medium which is in imperfect thermal contact with the fluid medium. As disclosed and claimed in the above-referenced patent applications, the phenomenon can be utilized, for example, to produce an acoustically driven heat pump which has no moving mechanical parts.

Although the phenomenon is based on a heat transfer process which is intrinsically irreversible in the thermodynamic sense, the process is functionally reversible in practical application, thus also realizing the production of a heat engine that operates at acoustic frequencies and which also has no moving mechanical parts. The present invention represents yet another practical application of the intrinsically irreversible heat transfer phenomenon, which application is generally related to and yet altogether distinct from the above-mentioned applications.

SUMMARY OF THE INVENTION

It is the object and purpose of the present invention to provide a method and apparatus for measuring both the intensity and the directionality of reactive acoustic power density in a gas or other fluid.

It is another object of the invention to provide a device with which can be measured the directionality as well as both the real and the reactive acoustic power density levels in a fluid.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the present invention provides a method and an associated apparatus for measuring reactive acoustic power density in a fluid. The apparatus of the invention is referred to herein as a thermoacoustic couple. The thermoacoustic couple comprises temperature sensing means disposed adjacent substantially parallel opposite edges of at least one thermally conductive plate. In a preferred embodiment the temperature sensing means comprises a plurality of thermocouple elements. The thermocouple elements are electrically connected in series so as to form a thermopile which is of enhanced sensitivity to small temperature differences between the opposite edges of the conductive plate. Additionally, in the preferred embodiment there are a plurality of such plates stacked in parallel and spaced from one another, with the thermopiles of the stacked plates also connected in series to form a single thermopile. The voltage produced by the thermopile is representative of the temperature difference between the opposite edges of the plates, which is in turn representative of the reactive acoustic power density in a fluid in which the couple is situated.

The method of the invention comprises the positioning of at least one thermally conductive plate in a fluid medium, and measuring the difference in temperature between opposite parallel edges of the plate. The temperature difference is representative of, and can be directly correlated with, the reactive acoustic power density level in the fluid. The reactive power density level which is measured is the quantity of acoustic energy moving back and forth in reciprocating manner in the fluid medium along the direction parallel to the plane of the plate and transverse to the edges of the plate at which the temperature difference is measured. The measured temperature difference is approximately proportional to the cosine of the angle between this direction and the direction of reciprocal motion of the acoustic energy, thus enabling directionality of the acoustic energy in the fluid to be determined.

The apparatus and method are sensitive to both reactive and real acoustic power density, although the sensitivity to reactive power density is approximately an order of magnitude greater than the sensitivity to real power density. Also, the polarity of the signal generated by the apparatus is reversed in the case of real power density, all other parameters held constant.

The thermoacoustic couple measures a quantity which is proportional to the product of acoustic pressure and acoustic velocity. It is most sensitive to this product when the two are 90 degrees out of time phase with one another.

BRIEF DESCRIPTION OF THE DRAWINGS

The accompanying drawings, which are incorporated in and form a part of the specification, illustrate certain embodiments of the present invention and, together with the following description, serve to explain the principles of the invention. In the drawings.

DETAILED DESCRIPTION OF THE INVENTION

Figure 1:
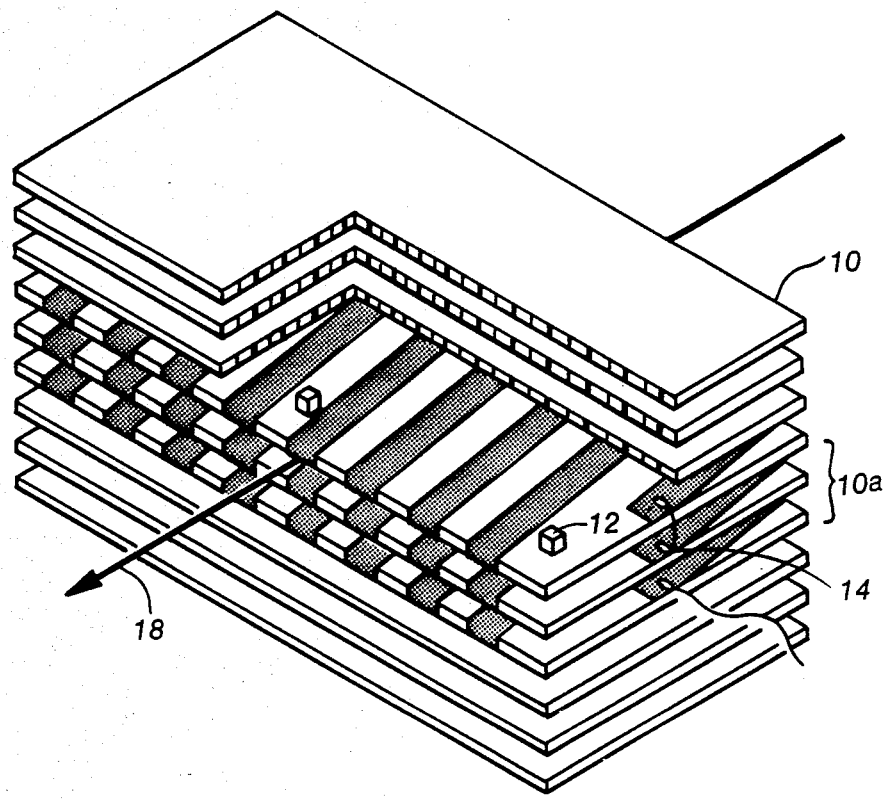
FIG. 1 is an isometric view of one embodiment of the thermoacoustic couple of the present invention, with a portion of the couple removed for purposes of illustration.

FIG. 1 illustrates one preferred embodiment of a thermoacoustic couple constructed in accordance with the present invention. The couple consists of a set of nine polymerized epoxy resin (fiberglass) plates 10 which are parallel to one another and which are spaced apart by small fiberglass spacers 12. Each plate is approximately 1.0 inch long, 0.5 inch wide and 0.003 inch thick. The spacing between the plates is approximately 0.040 inch.

Figure 2:
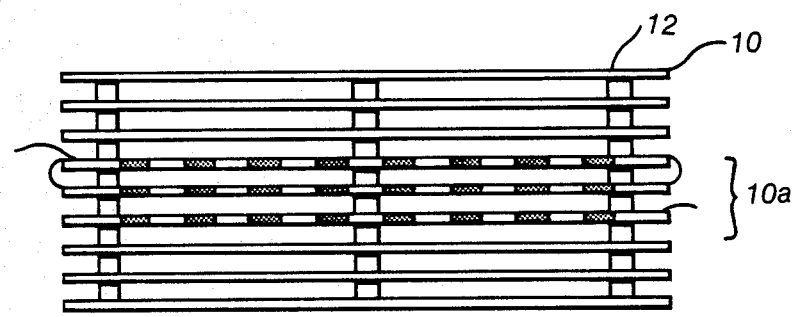
FIG. 2 is an end view of the embodiment shown in FIG. 1.

There are three plates in the middle of the stack, which are designated 10a in FIGS. 1 and 2. Each of the plates 10a includes a set of thermocouples which are formed of vapor-deposited strips 14 of chromel (a nickel-chromium alloy) and strips 16 of constantan (a copper-nickel alloy). The chromel strips 14 are deposited on the upper sides of the plates 10a and the constantan strips 16 are deposited on the lower sides. The strips 14 and 16 are arranged so as to meet at the opposite longitudinal edges of the plates, where they form a set of bimetallic junctions along the opposite edges. Each connected pair of bimetallic junctions forms a thermocouple which produces an electrical signal having a voltage that is proportional to the difference in temperature between the opposite edges of the plate. In the illustrated embodiment, there are eight pairs of bimetallic junctions on each plate, which together form a thermopile consisting of eight thermocouples. The thermopiles of the three plates 10a are also connected in series, thus forming a thermopile arrangement consisting of a total of 24 thermocouples.

The couple has a longitudinal axis 18 which is defined as being perpendicular to the longitudinal edges of the plates and also parallel to the planes of the plates. In practice, the thermoacoustic couple is most responsive to acoustic energy having a directionality parallel to the axis 18, as further discussed below.

Figure 3:
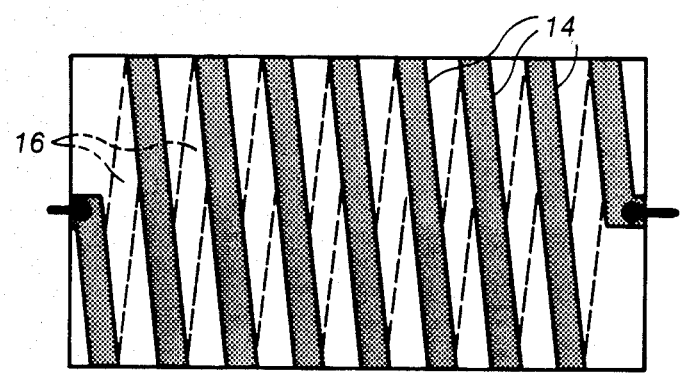
FIG. 3 is a top view of one plate element 10a of the embodiment shown in FIG. 1.
Figure 4:
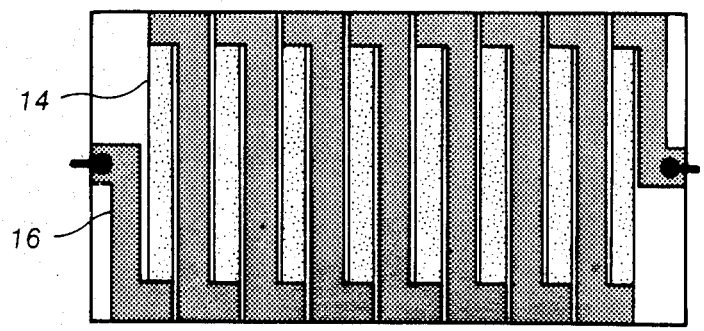
FIG. 4 is a top view of an alternative plate element 10a that may be used in a couple such as that shown in FIG. 1.

In the embodiment of FIGS. 1–3, the bimetallic thermocouple junctions are located along the edges of the plates 10a. However, it is not strictly necessary that the junctions be located in this manner; it is sufficient for the junctions to be located at spaced apart locations along the plates, preferably as near to the longitudinal edges as possible. Accordingly, an alternative embodiment is shown in FIG. 4, in which the metallic strips 14 and 16 and the associated bimetallic junctions are all located on one side of the plate, with the junctions being located near the opposite edges of the plate. The assembly of FIG. 4 is easier to construct because all of the metallic strips can be deposited on only one side of the plate, and without the necessity of forming the junctions along the edges of the plates. The embodiment of FIG. 4 is presented because it represents a substantially simpler and more economical construction with little sacrifice in efficiency.

The temperature difference $\Delta T$ across the thermoacoustic couple is given by the equation:

$$\Delta T = \tfrac{1}{4} R_{\text{eff}} P_a V_a \pi \delta_\kappa \left( \frac{1 - \sigma^{\frac{1}{2}}}{1 + \sigma} \cos\phi - \frac{1 + \sigma^{\frac{1}{2}}}{(1 + \sigma)} \sin\phi \right) \quad (1)$$

where $R_{\text{eff}}$ is the effective thermal resistance between the ends of the couple, $P_a$ is the acoustic pressure amlitude, $V_a$ is the component of the acoustic velocity amplitude parallel to the plate axis, $\pi$ is the length of the perimeter of a section through the plates of the couple normal to its axis, $\delta_\kappa$ is the thermal penetration depth ($\delta_\kappa = (2\kappa/\omega)^{\frac{1}{2}}$, where $\kappa$ is thermal diffusivity of the gas and $\omega$ the radian frequency of the acoustic wave), $\sigma$ is the Prandtl number of the gas ($\sigma = \nu/\kappa$, where $\nu$ is kinematic viscosity), and $\phi$ is the phase angle by which the velocity leads the pressure at the couple. Those skilled in the art will understand that the term reactive acoustic power generally refers to power such as that which exists in a pure standing acoustic wave, for which $\phi = \pi/2$, whereas the term real acoustic power refers to the power in a travelling wave, for which $\phi = 0$. In either case, the power density is equal to the product $P_A V_a$. For ordinary gases, $\sigma \lesssim 1$, so that the coefficient of sin $\phi$ in Eq. (1) is much larger than that of cos $\phi$ and hence the couple is most sensitive to reactive power.

The thermoacoustic couple of the illustrated test device has sufficient sensitivity to generate an easily measurable temperature difference so long as the dynamic pressure of the sound is on the order of a tenth of a percent of the static pressure. However, it is to be noted that even a single plate having thermocouple junctions along its opposing edges would produce the effect on which the invention is based. Multiple-plate devices are preferred however because they are considerably more efficient. The lesser efficiency of a single-plate device is due not only to the fewer number of thermocouple junctions, but also due to the fact that the thermal conductivity of the surrounding gas is sufficiently high to effectively prevent the development of as large a temperature difference between the opposing edges of the plate as can be obtained in a multiple-plate device. In the multiple-plate device the multiple plates effectively suppress the thermal conductance of the gas by increasing the relative amount of heat conducted by the solid plates. It is for this reason that the illustrated preferred embodiment has plates which are non-functional in the sense that they do not include thermocouple arrays.

Any suitable low-noise amplifier may be used to detect and amplify the signal produced by the thermoacoustic couple in response to a sound level. A typical sensitivity of a single chromel-constantan electrical thermocouple is on the order of 60 microvolts per degree Celsius.

The acoustic couple has directional as well as amplitude sensitivity. Specifically, the sensitivity of the couple varies as a function of the cosine of the angle between the longitudinal axis 18 of the couple and the direction of dynamic reciprocal gas flow. This result holds true both in the case of a standing wave and in the case of a traveling wave.

The thermoacoustic couple is also sensitive to real acoustic power density, particularly in the majority of common gases which have a Prandtl number on the order $\frac{2}{3}$, although such sensitivity is approximately an order of magnitude less than the sensitivity with respect to reactive power density of the same level. However, it will be recognized that real acoustic power density can be readily converted to reactive power density, and thus measured with greater sensitivity, by placing an acoustic reflector behind the acoustic couple. Such a reflector converts traveling acoustic waves passing through the couple to standing waves, the reactive power density of which can be measured with relatively greater sensitivity.

Figure 5:
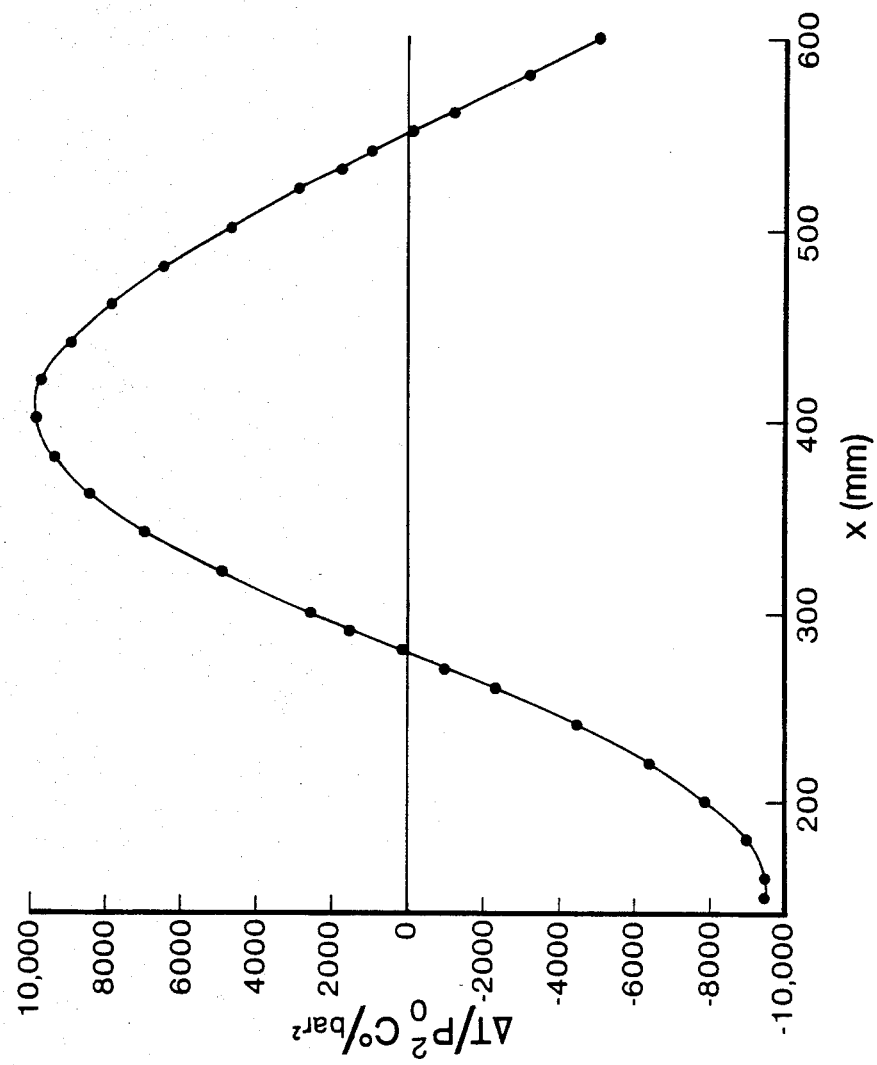
FIG. 5 is a graphical representation of experimental results obtained with a prototype thermoacoustic couple constructed in accordance with the present invention.

The actual operation of the embodiment shown in FIGS. 1 through 3 is illustrated in FIG. 5. FIG. 5 presents the results of an experiment in which sound was generated in a one inch diameter metal tube by means of an acoustical driver a (loudspeaker) positioned at one end of the tube. The opposite end of the tube was sealed. The thermoacoustic couple was positioned at various points within the tube to obtain the measurements presented in FIG. 5, wherein the position of the thermocouple along an arbitrary section of the tube is designated in millimeters (x). The tube was filled with $^4$He at a pressure of 2.55 bars. The frequency of the acoustical driver was adjusted to a resonant frequency of approximately 1 kHz to produce a standing wave in the tube. Under these conditions, the phase angle $\phi$ in Equation 1 is usually approximately plus or minus $\pi/2$ as the couple is moved along the tube. In a standing wave, the quantity $P_a V_a$ is a sinusoidal function of position, giving rise to the sinusoidal variation in the observed temperature difference $\Delta T$.

It is contemplated that the acoustic couple will find practical application in the art of acoustic analysis and engineering. Specifically, it is contemplated that the ability to measure the directionality, as well as both real and reactive acoustic power density levels in a fluid, all with a single, simple device, will augment and enhance conventional acoustic analyses, which until now have relied entirely on the measurement of acoustic power density levels using combinations of conventional acoustic transducers.

It is also contemplated that the present invention will be most efficiently manufactured through the use of photolithographic techniques such as are used to manufacture integrated microelectronic circuits. With such techniques it is considered feasible to construct a multiplate thermoacoustic couple having on the order of ten thousand thermocouple junctions, thereby greatly increasing the sensitivity of the device over the prototype devices described above.

The foregoing description of certain preferred embodiments of the invention has been presented for purposes of illustration and description. It is not intended to be exhaustive or to limit the invention to the precise form disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for determining the reactive acoustic power density level in a fluid, comprising the steps of:
    positioning in said fluid at least one thermally conductive plate having substantially parallel edges at opposite ends thereof:
    orienting said plate so as to obtain a maximum difference in temperature between said substantially parallel edges of said plate, whereby said plate is oriented so that the direction of acoustic reciprocal motion in said fluid is substantially parallel to the plane of said plate and substantially transverse to said parallel edges of said plate:
    measuring the temperature difference between said parallel edges of said plate, whereby the level of reactive acoustic power density in said fluid may be determined by correlation with said temperature difference.

* * * * *